Sept. 22, 1936.　　F. P. HEFFERNAN ET AL　　2,055,078
ABNORMAL MILK DETECTOR
Filed March 5, 1935

INVENTORS:
Francis P. Heffernan
Norman C. Stull
Louis Illmer
THEIR ATTORNEY.

Patented Sept. 22, 1936

2,055,078

UNITED STATES PATENT OFFICE 2,055,078

ABNORMAL MILK DETECTOR

Francis P. Heffernan, McLean, and Norman C. Stull, Cortland, N. Y.

Application March 5, 1935, Serial No. 9,458

7 Claims. (Cl. 31—58)

This invention has to do with dairy equipment that expedites the milking a herd of blooded and other milch cows and is intended to maintain a high quality standard for such milk output. The present improvements more particularly relate to a simple protective milk pail accessory or sampling tray adapted to detect visibly in a timely manner, any abnormality as regards stringy, flaky, bloody, gargety, unnatural color or other diseased condition in the milk being delivered by any one cow. Such occurrence is herein visually revealed to the milker during the foremilking period while the teats are first being manipulated by hand. The consistent use of our device enables a competent dairyman to insure a pure and wholesome grade A milk of a low bacterial count. That is to say, the aggregate supply of such milk when taken from different cows, is not likely to become collectively impaired nor rendered unfit because of the admixtures of any contaminated component furnished by one or more unhealthy cows.

Structurally our detector preferably comprises a trough shaped strainer or sampling tray that is conveniently arranged to receive the first milk therethrough for preliminary test purposes. The bottom region of our tray may be shaped to provide for a pair of horizontally disposed dash ledges against which to initially squirt the test milk. Such ledge means break the force of the impinging liquid and may be slightly inclined to drain laterally over and through an intermediary strip sieve or sifting screen into the bottom of the pail. Our sampling tray may be inbuilt into the mouth of a milk pail or removably suspended upon or across the rim region of such pail, preferably with the strainer medium located wholly beneath the rim level to obviate splashing of the milk or otherwise bringing about unsanitary barn conditions.

When a sample of the foremilk is caused to flow slowly through a strainer of relatively fine mesh, any abnormal characteristic may readily be detected by observation on part of an experienced milker, whereupon any such unnatural milk is not utilized. In its operative position, the strainer element of our trough is disposed to fall in the vision line of the milker and coincident with the milk stream. Such sieve means may also be artificially illuminated when employed in poorly lighted barns or the like.

Upon completion of a satisfactory sampling test, the remainder of the foremilk need no longer be passed through our tray strainer at an inherently slow trickle rate. Instead, the spread of the superficial bottom region of our detector tray is purposely confined to cover but a minor portion of the gross mouth area embraced within the rim of a milk pail. The disposition is such as to leave a contiguous unobstructed space alongside the tray through which to simultaneously direct several milk streams toward the bottom of the pail, all without being obliged to slow up the whole of the foremilking process upon finding the milk specimen to be of acceptable quality. Such improved strainer arrangement constitutes an outstanding feature of our invention in that it permits the entire foremilking operation to be expedited by the use of a single utensil.

The present detector tray has been more particularly devised to meet the requirements of certain prevailing sanitary codes and regulations. The strainer medium is herein so designed that the time required for milking a large herd is not unduly extended nor does its use involve any protracted delay such as heretofore set many dairymen against the regular use of conventional foremilking testers.

Upon completing a preliminary sampling through our detector tray, the remaining foremilk may without interruption, be bypassed around the strainer medium. Should the milk quality of any one cow prove questionable, a relatively larger amount of foremilk is passed through our sampling tray to verify any such findings. In order to meet the requirements of high quality, grade A dairy products, it is customary to initially take off a pint or more of foremilk, which coming from the lower udder portion, is likely to be devoid of the desired butter fat content, and as such is usually discarded.

In practice, a relatively large pail when provided with our sampling tray, serves to collectively draw off the foremilk from different cows in the manner indicated, whereupon the milking of any individual cow may be completed by using another regular pail to receive such portion of the tested product that is intended for delivery to the milk station. Upon proving up the requisite foremilking sample, a herd of cows may then be safely milked manually or by machine methods.

We preferably locate a common drain aperture centrally between a pair of oppositely disposed ledge components as formed in a bottom tray wall and against which different cow teats may alternately inject streams of foremilk. Said aperture may be kept sufficiently large to subtend athwart perimetric regions of the bottom wall in order that a single aperture may wholly command and suffice to freely drain the lowermost portion of the respective discharge edges of our ledges. A screen of suitable mesh overlies this common drain outlet, the arrangement being such that a milk stream when ejected against one of said ledges, slowly flows thereover into a superficially spread formation without being allowed to impinge directly against the strainer medium. No outlet other than a single strainer is herein provided and each such ledge lies wholly to one side of this interposed strainer. The use of duplicate drainable ledges facilitates rapid milking.

Our strainer is of a size that freely carries off the tested milk at a lowermost level approximately as fast or faster than it is being delivered in order not to retain any residue from a previously milked cow. It is further emphasized that such ledge and its strainer are kept clearly within sight so as to promote visibility for the contemplated test purposes when the strainer is held close to an udder and away from the milker. Where two teats are simultaneously milked into a common tray as intended, the streams are preferably not crossed over or otherwise intermingled, so that each ledge may afford a separate check on an individual milk stream or udder quarter. The entire body of ejected milk from a given cow does not always prove defective, but only an initial portion thereof may be found diseased. Hence, to provide for a reliable test, all of the ejected foremilk should properly spread over a ledge medium without the possibility of bypassing or otherwise eluding observation.

The object of our invention is to provide for a low cost and effective protective strainer tray of the character indicated that can either be inbuilt into a milk pail or attached thereto as an accessory comprising the minimum number of sample parts, all of which can readily be thoroughly cleansed and otherwise kept in a sanitary condition.

Embodied herein are also certain structural details designed to facilitate the end in view. Reference is had to the accompanying one drawing sheet which discloses certain alternative embodiments of our invention, and in which drawing:

Fig. 3 represents a top view of Fig. 2, while

Figure 6:
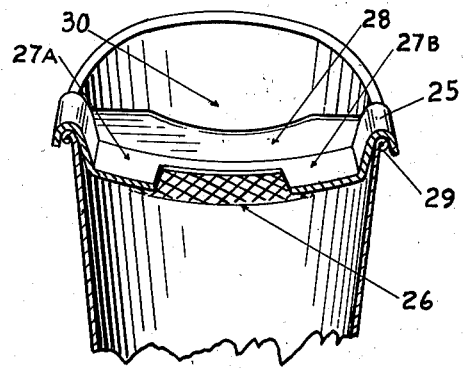
Fig. 6 illustrates a combined fragmental section and perspective view of a modified type of tray that may be inbuilt into the mouth of a milk pail.
Figure 1:
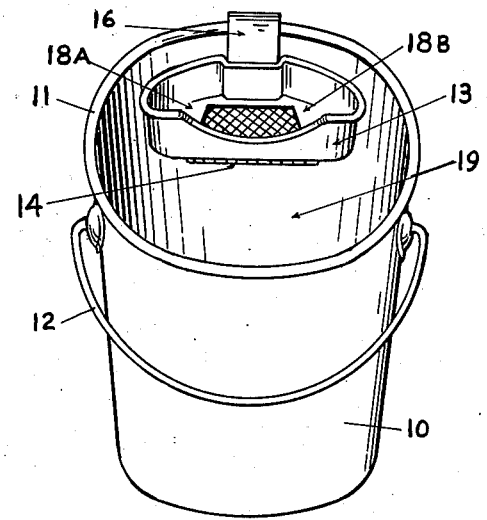
Fig. 1 shows in perspective, a conventional foremilking pail equipped with our detector tray as removably suspended from the rim thereof.
Figure 3:
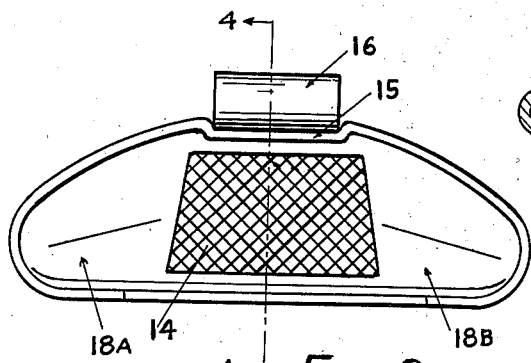
Figure 4:
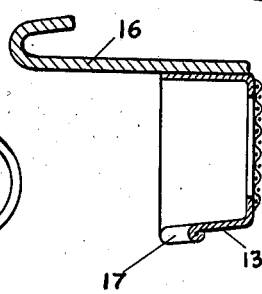
Fig. 4 depicts a sectional view taken along line 4—4 of Fig. 3.
Figure 2:
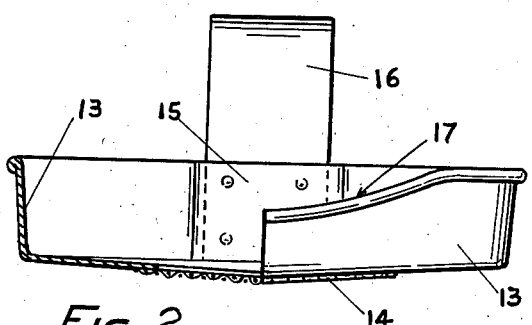
Fig. 2 shows an elevational front view of such tray as taken in partial section to better disclose the cooperative ledge and strainer assembly.

Referring first to Figs. 1 to 4, the conventional milk pail 10 is of relatively large size, preferably including a tubular shell portion that terminates in an endless rim 11 and which rim circumscribes the open mouth of such pail in the usual manner. The pail may be carried by the bail 12.

Removably suspended upon said rim, is a cross-sectionally dished protector tray which may be drawn or otherwise shaped up in one piece out of sheet metal or other material to comprise a flared upstanding skirt portion or endless side wall component 13. The transverse bottom wall of said tray is here given a segmental shape including a chord edge and which wall is centrally pierced to afford a drain hole therethrough. A fine meshed strainer medium 14 may be disposed to overlappingly span said hole, as shown. The circular rear portion of the upstanding skirt or side wall 13 is shaped to nest snugly within the bore of the pail shell. Such side wall may be vertically inset as at 15 to receive the rectilinear shank of a separately formed hook-shaped suspension lug 16, the latter being flushly riveted, welded or otherwise secured in place. If made from ferrous metal, the constituent cup elements are preferably tinned after being assembled, to prevent rusting.

The upper edge of the forward or rectilinear skirt portion of such tray is preferably cut away to shape up a depression 17 that affords a clearer view of the test strainer 14. The pocketed bottom wall end portions lying to either side of its pierced hole, respectively provide for complementary imperforate dash ledges 18A and 18B which may be slightly inclined to drain toward their interposed strainer 14. These plural ledges are so placed that the milker may simultaneously direct streams from different teats toward the respective ledge regions, which then drain into a common outlet. The relatively high skirt region lying contiguous to each such ledge, prevents splash-over into the bucket. The topmost skirt edges of our tray may be reenforced by bending the same outwardly so as to form beaded edges. The strainer mesh is preferably attached underneath the bottom wall so as to be at a lower level than the pail rim, as indicated. By slightly flaring the skirt wall 13, the tray may be more easily drawn to shape, and several of the trays may be compactly stacked for lot shipments.

By allowing such foremilk to gravitate slowly and thereby spread toward and over the strainer, its characteristic condition can readily be observed prior to starting to milk for a usable portion of the supply. It will be observed that the tray area does not wholly fill or close up the whole mouth of the pail 10, but that a relatively large clearance space or unobstructed gap 19 is left alongside the forward rectilinear portion of the skirt 13, through which to bypass the foremilk after it has been proven to possess the desired quality.

Figure 5:
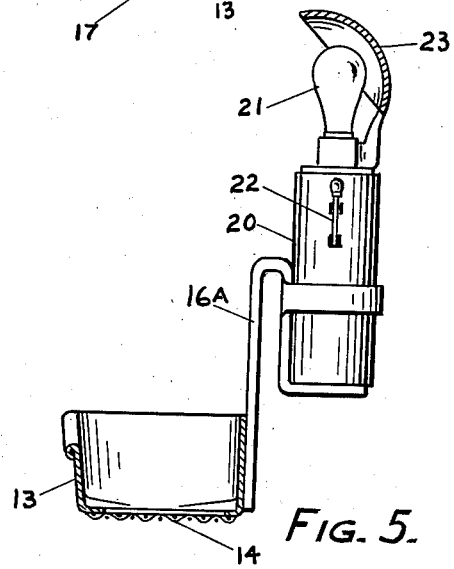
Fig. 5 is similar to Fig. 4 but is additionally provided with a flash light designed to shed artificial illumination upon the strainer portion of such tray.

In the event our device should be used in barns that are not adequately lighted during the milking period, each such tray may be individually equipped with a cylindrical flash light dry battery 20, together with an electric bulb 21 of the kind schematically represented in Fig. 5. The required battery circuit preferably includes a handily placed switch 22 and a reflector 23 may be arranged to direct the illumination upon the tray strainer 14. Such switch may be thrown to light the bulb while the foremilk is being tested through said tray. The entire artificial lighting facilities are preferably located exteriorly of the pail and mounted upon a modified lug 16A to constitute a unitary tray structure.

Fig. 6 discloses a similar but bridge type of tray adapted to span the rim of a milk pail, either as an inbuilt unit or as a detachable accessory. The structural elements corresponding to the previously described exemplification, reside in the complementary lugs such as 25, a strainer 26, a bottom wall comprising complementary dash ledges 27A and 27B and a pair of upstanding skirt walls such as 28. The strainer element is again disposed beneath the level of the rim 29, and if desired, a lightable bulb such as 21 may also be attached to the lugs of this style of tray. In the present instance, discharged streams of foremilk may respectively be bypassed through oppositely disposed clearance gaps such as 30 lying within the rim and contiguous to either side of such bridging tray.

As will be understood by those skilled in this art and from the previously described mode of operation, our detector device is to be utilized during the foremilking period. By the simultaneous manipulation of two teats, separate streams of such milk may be alternately ejected against the respective dash ledges of our trough. This milk is then allowed to slowly drain through the interposed strainer to detect any irregularity in milk quality. Immediately upon passing the intended preliminary observation test, the remainder of the foremilk may be unobstructedly discharged through the clearance gap such as 19 without being obliged to await upon a continued trickle through the strainer element 14 nor requiring any change in equipment prior to terminating the foremilking operation. With our equipment, both hands are kept available for rapid milking. It will be obvious that the resulting reduced time element represents a considerable saving in labor and other operative costs where a herd of cows are to be milked on a large productive scale. Our improved device further conforms with modern practice in insuring a supply of hygenic milk without undue wastage and one capable of satisfying exacting code requirements.

It will be obvious that equivalent tray embodiments may be resorted to in bringing about a like result, it being further understood that we reserve the right to modify any of the disclosed illustrative details, without departing from the spirit and scope of our invention, heretofore described and more particularly pointed out in the appended claims.

We claim:

1. A milk pail accessory comprising a sampling tray adapted to visually detect abnormality in the condition of the foremilk being delivered by any one of a herd of cows and which tray is provided with an apertured bottom wall including a ledge and having an upstanding side wall that circumscribes the perimeter of the bottom wall, strainer means disposed to bridge the wall aperture and extending continuously across opposed marginal regions of the bottom wall perimeter to drain the whole of said ledge, the initial portion of the foremilk being ejected against said ledge and allowed to slowly trickle through the strainer for test purposes, and means sustaining said tray contiguous to the mouth region of the pail, the superficial area of said bottom wall being kept sufficiently small in size to provide for a gap opening through which foremilk may be bypassed around the strainer medium and into the pail subsequent to sampling a portion of the foremilk taken from said one cow.

2. A milk pail accessory comprising a sampling tray adapted to visually detect abnormal milk during the foremilking period and which tray is provided with an apertured transverse bottom wall, unitary strainer means disposed to screen the wall aperture in a spanning relation to opposed marginal regions of the bottom wall perimeter and serving to initially sift a portion of milk therethrough for sampling purposes, a portion of the strainer means being located at the lowermost region of the bottom wall and its superficial area being kept sufficiently large to allow its interstices to drain a stream of foremilk therethrough as fast as it is being ejected into the tray, and means suspending said tray within the mouth region of the pail, the superficial area of said bottom wall being kept smaller than that corresponding to the circumscribing pail mouth and providing for an unobstructed gaplike opening in the remaining confines of said mouth region, and the tray disposition being such that upon completing the sampling of the aforesaid milk portion, the remnant thereof may be freely bypassed through said gaplike opening without having to trickle through the strainer means.

3. A milk pail accessory comprising a sampling tray having an elongated bottom wall and a side wall erected thereon, said bottom wall being provided with a single aperture between the ends thereof, and the opposite end regions of which last named wall are respectively shaped to constitute ledges arranged to substantially drain the whole superficial area of both ledges through such single aperture, a strainer medium spanning said aperture, and means for suspending the tray within the mouth of the pail beneath the rim thereof and the width of which bottom wall is kept narrower than the corresponding dimension given to said rim to provide for a bypass gap therebetween.

4. A milk pail accessory comprising a troughlike sampling tray including an apertured, relatively flat transverse bottom wall shaped to substantially conform with a segment of a circle having a chord edge and which wall provides for complementary imperforate ledge means respectively disposed at the opposite end regions of said segmental shape with the aperture centrally interposed therebetween and which aperture is located at the lowermost region of the bottom wall, a single strainer medium arranged to bridgingly span the wall aperture and serving to freely drain both ledges downwardly therethrough, and means for suspending said tray from the pail rim and which suspended tray leaves an unobstructed bypass gap alongside the chord edge of the aforesaid bottom wall that communicates with the bottom of the pail.

5. A milk pail accessory comprising a sampling tray adapted to visibly detect abnormal milk and to be nested into similar trays in stacked relationship, said tray comprising a substantially flat, transverse bottom wall having an upwardly flared side wall extending integrally around the wall perimeter and which wall has an aperture therethrough that substantially spans oppositely disposed marginal regions of such wall perimeter, a single strainer medium disposed to overlap said wall aperture and drain the lowermost portion of said bottom wall, and means suspending the aforesaid tray within and beneath the rim confines of said pail, the overall perimeter of the said bottom wall being kept relatively smaller size than that of the rim of the pail to provide for a clearance gap therebetween through which milk may be unobstructedly bypassed into the bottom of the pail.

6. A unitary milk pail accessory comprising a sampling tray adapted to visually detect abnormal milk, said tray comprising a transverse bottom wall having a drain aperture therethrough which subtends opposite regions of the wall perimeter, a strainer medium disposed to bridge said aperture, means suspending the tray within the mouth end region of said pail, and lightable lamp bulb means serving to artificially illuminate the strainer medium.

7. A unitary milk pail accessory comprising a sampling tray adapted to visually detect abnormal milk, said tray comprising a bottom wall having an aperture therethrough, a strainer medium disposed to overlie said aperture, lug means suspending the tray within the mouth end confines of said pail; and a battery together with a co-operating electric lamp carried by the lug means, said lamp being located to illuminate the strainer medium while the tray is being utilized for sampling purposes.

FRANCIS P. HEFFERNAN.
NORMAN C. STULL.